(12) United States Patent
Mikan et al.

(10) Patent No.: US 8,417,178 B2
(45) Date of Patent: *Apr. 9, 2013

(54) SYSTEM AND METHOD FOR OPTIMIZATION OF NETWORK DELIVERY OF STREAMING DATA

(75) Inventors: Jeffrey Clinton Mikan, Atlanta, GA (US); Justin McNamara, Atlanta, GA (US); John Lewis, Lawrenceville, GA (US); Fulvio Cenclarelli, Suwanee, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/464,233

(22) Filed: May 4, 2012

(65) Prior Publication Data

US 2012/0278447 A1     Nov. 1, 2012

Related U.S. Application Data

(63) Continuation of application No. 13/101,265, filed on May 5, 2011, which is a continuation of application No. 11/868,064, filed on Oct. 5, 2007, now Pat. No. 7,945,205.

(51) Int. Cl.
   H04H 20/71        (2008.01)

(52) U.S. Cl.
   USPC .......................................... 455/3.01

(58) Field of Classification Search .................. None
   See application file for complete search history.

(56) References Cited

U.S. PATENT DOCUMENTS

| 7,212,781 | B2 | 5/2007 | Hikomoto |
| 7,519,369 | B2 | 4/2009 | Yahagi |
| 7,738,832 | B2 | 6/2010 | Sinnarajah et al. |
| 7,945,205 | B1 * | 5/2011 | Mikan et al. ................. 455/3.03 |
| 8,195,086 | B2 * | 6/2012 | Mikan et al. ................. 455/3.03 |
| 2007/0254619 | A1 | 11/2007 | Salomone et al. |
| 2007/0293143 | A1 | 12/2007 | Harris |
| 2009/0185522 | A1 | 7/2009 | Periyalwar et al. |

* cited by examiner

*Primary Examiner* — Philip Sobutka
(74) *Attorney, Agent, or Firm* — Parks IP Law LLC; Jennifer P. Medlin Esq.

(57) ABSTRACT

A system and method for optimizing network delivery of streaming data is provided. Streaming delivery of data using point-to-point transmitters and broadcast transmitters can be dynamically controlled to maximize the usage of network resources. Current usage of respective systems can be analyzed, as can projected usage be analyzed. Network resources can be reallocated, and connecting devices can be redirected as needed to maintain high efficiency of allocated resources.

20 Claims, 6 Drawing Sheets

SYSTEM AND METHOD FOR OPTIMIZATION OF NETWORK DELIVERY OF STREAMING DATA

CROSS REFERENCE TO RELATED APPLICATION

This application is a continuation of U.S. application Ser. No. 13/101,265, filed May 5, 2011, which is a continuation of U.S. application Ser. No. 11/868,064 (now U.S. Pat. No. 7,945,205), filed Oct. 5, 2007, the entireties of which are herein incorporated by reference.

TECHNICAL FIELD

The present invention relates generally to the field of communications networks. More particularly, the present invention relates to a system and method for optimization of network delivery of streaming data to a mobile communications device.

BACKGROUND

With the proliferation of communications devices has come a corresponding increase in the demand on communications networks. As user demand for internet protocol television (IPTV) and other streaming content increases, the demands put on communications networks also continues to increase.

For example, the delivery of an IPTV stream requires substantial network resources. Typically, the video stream is broken down into a series of packets and encoded. The video stream packets are then transferred to a user device, e.g., a personal computer, a mobile telephone, or the like. Once received, the packets are decoded, reassembled, and displayed as a video. Sending encoded video packets can require substantial network resources, such as, but not limited to, bandwidth, transfer rates, and the like. For example, the delivery of one stream of standard definition television (SDTV) requires the transfer of approximately 1.0-1.5 Megabits per second (Mbps) of data. The delivery of one stream of high definition television (HDTV) at 1080i (1,080 vertical lines, interlaced) requires the transfer of approximately 7.0-8.0 Mbps of data.

With the proliferation of streaming content delivery to mobile communications devices, the issue of bandwidth becomes even more complex. Regardless of bandwidth requirements, delivery of streaming content to mobile communications devices adds new layers of complexity to the already complex problem of streaming content delivery. Furthermore, delivery of streaming content to mobile communications devices requires substantial network resources since the network often supports multiple users, multiple streams, multiple programs, and multiple protocols at any given time. Furthermore, the desire for high-resolution videos and increased frame rates is resulting in high bandwidth requirements, even for mobile communications devices. For example, one possible exemplary format for transferring streamed video content to mobile communications devices delivers video at a resolution of 2048×1024 pixels, and at a frame rate of 15 frames per second (fps). This exemplary format requires a data transfer rate of around 20 Mbps. Another exemplary format for transferring streamed video content to mobile communications devices delivers video at a resolution of 352×288 pixels and at a frame rate of 30 fps. This exemplary format requires a data transfer rate of only around 2 Mbps. However, with multiple streams at any given time, the network resources required can still be significant. The demand for resources will only increase as more and more devices are used to access an ever-increasing amount of streaming content. As shown by the wide variation in file format bandwidth requirements, optimization of network delivery can require dynamic analysis of all data streams at any given time. However, increasing bandwidth enough to cover all possible issues may not be possible.

Some telecommunications networks also have the ability to broadcast streaming content, in addition to the ability of delivering an individual stream of content directly to a device. Moving a content stream from a packet portion of a network to a broadcast portion of the network is generally desirable since any content that can be broadcast can reduce the demand for point-to-point IP sessions on the packet side of the network. Reducing demand for packet-based services can increase the responsiveness of the packet side of the network when handling tasks that cannot be performed without the packet side of the network. Services that require the packet side of the network include, but are not limited to, email, web browsing, file transfer, and the like. Unfortunately, the space on the broadcast side of the network is often limited, so there is not an endless supply of broadcast space. Furthermore, not every device has the ability to receive and/or display broadcast streaming data signals. Therefore, the network operator or service provider typically chooses which channels to broadcast to compatible devices. Any channels that are not chosen for broadcast must be streamed to devices as point-to-point streams of packet data by the network. Devices that cannot receive and/or display broadcast data must also open point-to-point streaming data sessions, even for the programs that are broadcast at the same time.

While all the foregoing issues make network optimization a complex task, the issue of network optimization is complicated still further, and perhaps to a greater degree, by the mobility of mobile communications devices. As mobile devices come and leave service areas of nodes on a network, the requirements for nodes can change. If a node is, for example, a base station transceiver (BTS) on a cellular network, then the demand for streaming content can be substantial at any given time, and the demand in terms of load and content can vary from one moment to the next as devices come and go from a node's service area. The dynamic nature of demand load and content can become even more pronounced if a node services an area through which devices frequently pass.

SUMMARY

A system and method for dynamically optimizing network delivery of streaming data are disclosed. Network and device performance, network and device resources, combinations thereof, and the like can be optimized. At any time, the current usage of network resources can be analyzed. This analysis includes determining how many devices are currently receiving streaming data through a point-to-point data session, and how many devices are currently receiving streaming data through a broadcast transmission. Additionally, the devices can be analyzed to determine what data delivery protocols are supported by each device, what subscriptions are included, what display formats are supported, and the like. Additionally, each device that is currently receiving data can be analyzed to determine what program is being received.

If a device that is capable of receiving broadcast data is receiving a currently-broadcasted program through a point-to-point data session, then the device can be instructed to begin receiving the program as broadcast data.

If a first number of devices are receiving a program that is not broadcast, and a second number of devices are receiving a program that is broadcast, then the difference between the first number and the second number can be calculated. The difference can be evaluated against a threshold value. The threshold value can be a dynamic value, a percentage, a dynamic percentage, a combination thereof, or the like. If the difference satisfies the threshold value, then the time for which the threshold value has been met can be determined. The time can be evaluated against a threshold time value. If the threshold time value is satisfied, then a program swap method can occur.

To swap programs, the low-demand broadcast program can be moved to a point-to-point transmitter, for example, a server on a network. Similarly, the high-demand streaming program can be moved to a broadcast transmitter. The devices can be instructed to initiate point-to-point and broadcast sessions, respectively. In this manner, the number of point-to-point streaming data users can be reduced. This method can be iterated as desired to provide dynamic optimization of network resources.

A system and method for optimizing network delivery of streaming content is disclosed. Network and device performance, network and device resources, combinations thereof, and the like can be optimized. At any time, the projected usage of network resources can be determined for a desired time frame. The desired time frame can include, for example, a next time block, a certain time block, an adjacent hour, etc. If a high-priority program is scheduled to be transmitted as a point-to-point data stream during the desired time frame, then the content package scheduled for broadcast during the desired time frame can be analyzed. If the high-priority program is scheduled to broadcast during the desired time frame, then the process can end.

If, however, the high-priority program is not scheduled to broadcast, then each program or channel scheduled for broadcast during the desired time frame can be analyzed. Current usage of network resources can also be analyzed, i.e., the number of devices receiving point-to-point streams of a certain program can be compared to the number of devices receiving broadcast streams of a certain program. The lowest priority broadcast program, and thereby channel, including analysis of the lowest-priority broadcast channel during the desired time frame, can be determined. The lowest priority broadcast channel can be moved to a point-to-point transmitter, for example, a server on a network. Similarly, the channel including the high-priority program can be moved to a broadcast transmitter. The devices can be instructed to initiate point-to-point and broadcast sessions, respectively. In this mariner, the number of point-to-point streaming data users can be reduced for the desired time frame. This method can be iterated as desired to provide optimization of network resources for any desired time frame.

Accordingly, an embodiment of the present invention includes a method of optimizing network delivery of data. A number of streaming devices can be identified. A streaming device can be defined as an electronic device that is receiving a first source of data through a point-to-point streaming data session, for example, from a network server. A streaming device is also capable of receiving data transmitted by a broadcast transmitter. Similarly, the number of broadcast devices can be identified. A broadcast device can be defined as an electronic device that is receiving a second source of data transmitted by a broadcast transmitter. A broadcast device is also capable of receiving data transmitted through a point-to-point streaming data session. The difference between the number of streaming devices and the number of broadcast devices can be calculated. This calculated difference can then be evaluated to determine if the calculated difference exceeds a predetermined threshold value. If the calculated difference exceeds the predetermined threshold value, then the first source of data can be routed for transmission by a broadcast transmitter.

According to another aspect, a network node is provided to optimize network delivery of data. The network node is configured to perform the steps of this method.

According to another aspect, the broadcast transmitter can transmit data as a multicast stream on UHF channel 55.

According to another aspect, the first source of data can be streaming video content.

According to another aspect, the second source of data can be streaming video content.

According to another aspect, if the calculated difference exceeds the predetermined threshold value, then the method can include additional steps. The duration for which the calculated difference has exceeded the predetermined threshold can be calculated. If the duration for which the difference has exceeded the predetermined threshold value fails to meet a durational threshold, then the first source will not be routed for transmission by a broadcast transmitter.

According to another aspect, a network node is provided to optimize network delivery of data. The network node is configured to perform the steps of this method and these additional steps.

According to another aspect, if the threshold value is satisfied, the method can also include the steps of ceasing broadcasting of the second source of data and instructing the broadcast devices to initiate a point-to-point data session for delivery of the second source of data.

According to another aspect, if the durational threshold has been satisfied, the method can further include the steps of ceasing broadcasting of the second source of data, and instructing the broadcast devices to initiate a point-to-point data session for delivery of the second source of data.

According to another aspect, the method further includes the steps of instructing the streaming devices to initiate reception of the first source of data from a broadcast transmitter on a broadcast channel.

According to another embodiment, a method of optimizing network delivery of data is provided. The method includes determining if a high-priority video stream is scheduled to begin at a designated time, for example, a subsequent time block. If a high-priority stream is scheduled to begin at a designated time, then the method also includes determining if the high-priority video stream is scheduled for transmission on a channel that is broadcast at the designated time. If the channel is not scheduled to be transmitted as a broadcast signal at the designated time, then a low-priority video stream that is scheduled to be transmitted as a broadcast signal at the designated time is routed from the broadcast transmitter for transmission as a point-to-point streaming data session, and the high-priority video stream is routed to the broadcast transmitter for transmission as a broadcast data stream on a broadcast channel.

According to another aspect, a network node is provided to optimize network delivery of data. The network node is configured to perform the steps of this method.

These and further features of the present invention will be apparent with reference to the following description and attached drawings.

DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
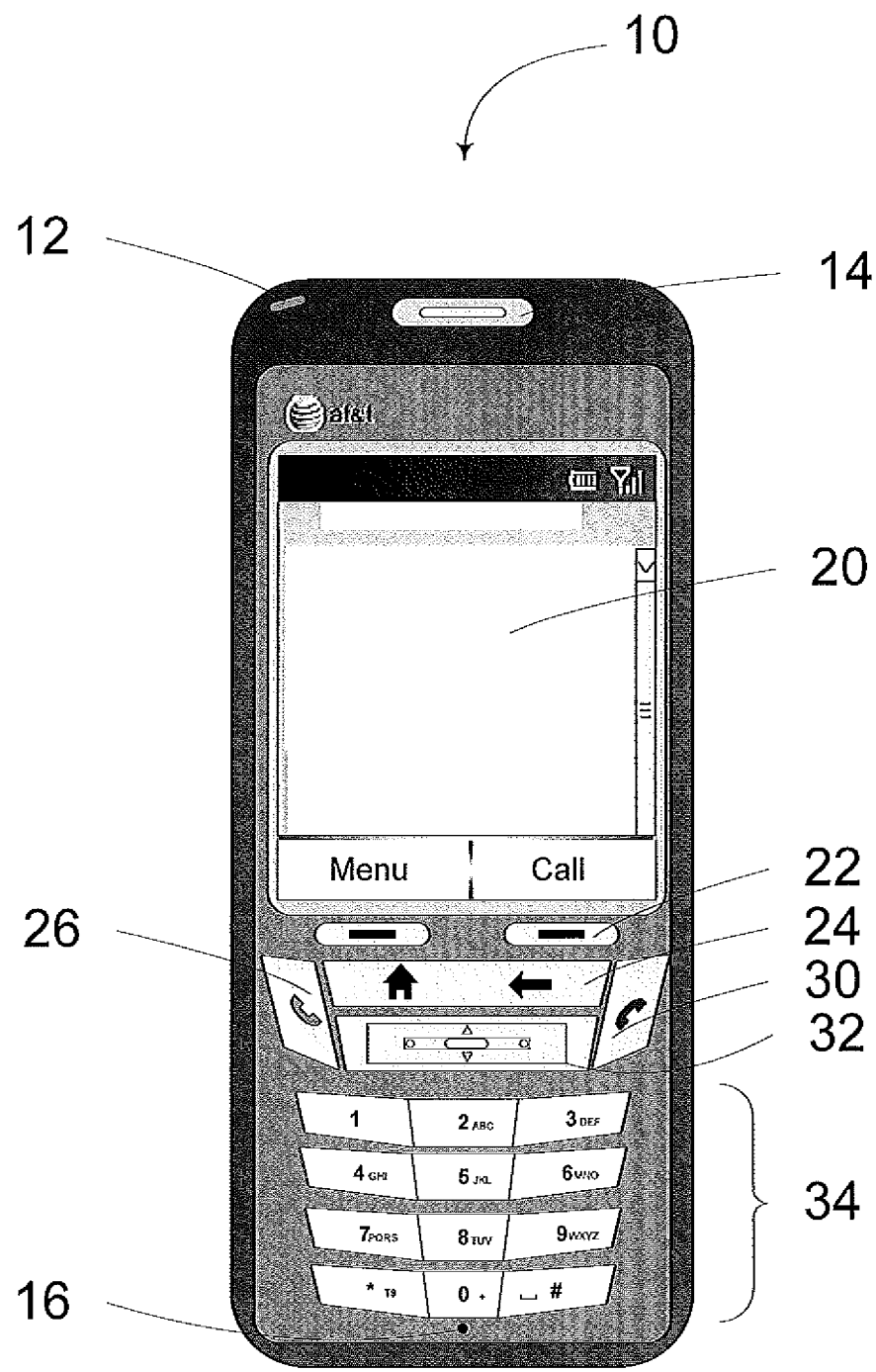
FIG. 1 is a plan view of an exemplary communications device.

Referring initially to FIG. 1, an exemplary electronic device 10 is illustrated. In the illustrated exemplary embodiment, the electronic device 10 is a mobile communications device ("device"). The device 10 can be, for example, a personal digital assistant ("PDA"), a handset, a portable computer, any device capable of wirelessly receiving a message, combinations thereof, and the like. The device 10 can include an indicator 12. The indicator can be, for example, a light emitting diode (LED) that indicates various status states of the device 10. The device 10 includes a speaker 14 and a microphone 16. The speaker 14 and the microphone 16 collectively and respectively transmit and receive audio signals. The device 10 includes a display 20 for communicating features and status to the user, and for enabling the user to navigate the control system and use various features of the device. The display 20 may also be used to display, for example, photographs, videos, movies, streaming video, GPS information, email, Internet, VM options, combinations thereof, and the like.

As illustrated, the device 10 can include a plurality of keys, including softkeys 22, function keys 24, an initiate call key 26, and a terminate call key 30. Some devices can also include a directional key 32. A directional key 32 can allow navigation through various menus and lists and/or can facilitate control of various features of the device. Instead of a directional key, some devices include a joy stick, a roller wheel, a rocker switch, or the like. A mobile communications device 10 can also include an alpha-numeric keypad 34 for inputting numbers and/or letters while interacting with the device. Although not illustrated, a device 10 can include a touch-sensitive screen instead of some or all of the illustrated keys.

Figure 2:
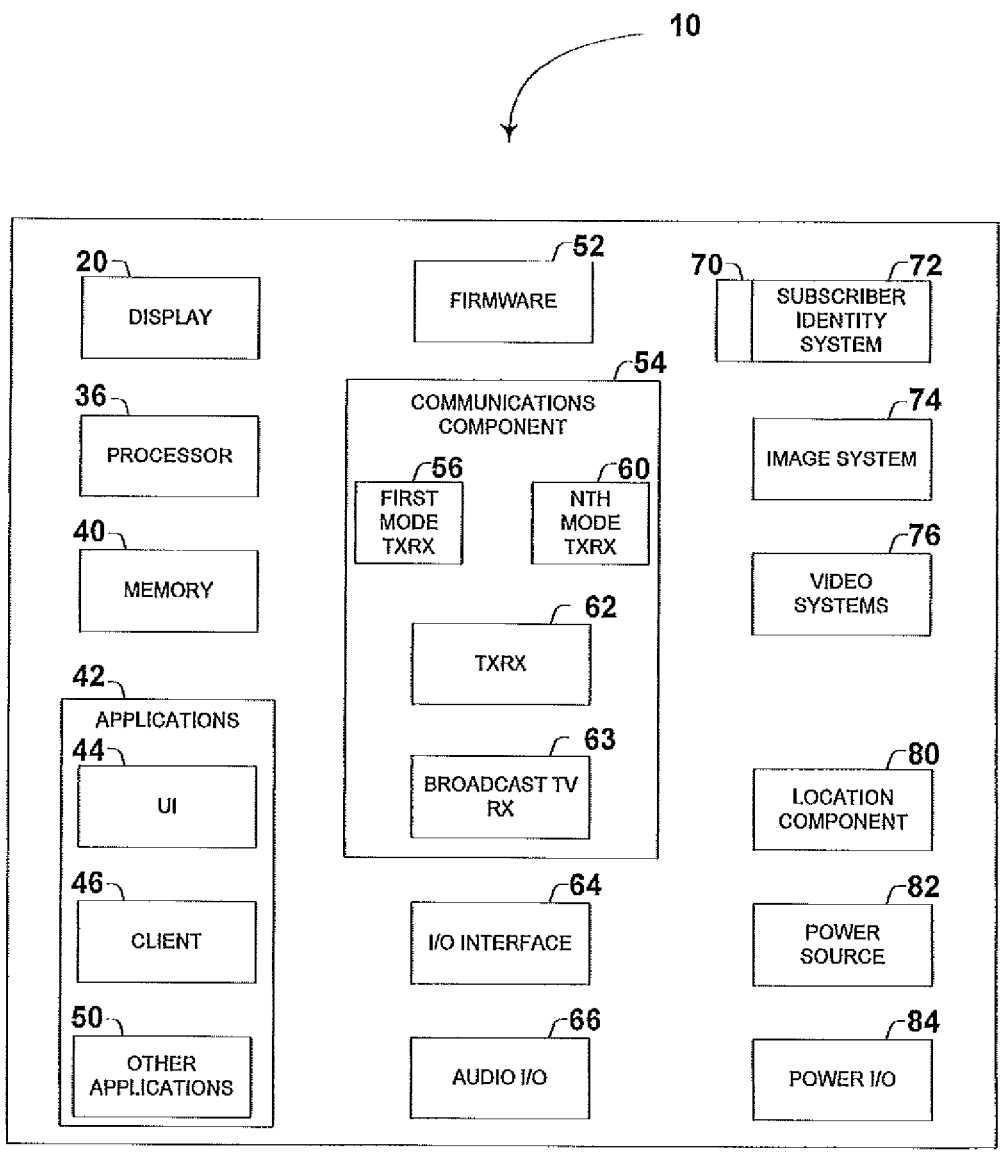
FIG. 2 is a schematic diagram of an exemplary communications device.

FIG. 2 illustrates a schematic block diagram of an exemplary mobile communications device 10 for use in accordance with an exemplary embodiment of the present invention. Although no connections are shown between the components illustrated and described in FIG. 2, the components can interact with each other to carry out device functions.

As illustrated, the mobile communications device 10 can be a multimode handset. FIG. 2 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 10 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 10.

The device 10 can include a processor 36 for controlling, and/or processing data. A memory 40 can interface with the processor 36 for the storage of data and/or applications 42. An application 42 can include, for example, video player software, user feedback component software, combinations thereof, and the like. The application 42 can also include a user interface (UI) application 44. The UI application 44 can interface with a client 46 (e.g., an operating system) to facilitate user interaction with device functionality and data, for example, answering/initiating calls, entering/deleting data, configuring settings, address book manipulation, multimode interaction, and the like. The applications 42 can include other applications 50 such as, for example, firmware, add-ons, plug-ins, voice recognition, call voice processing, voice recording, messaging, e-mail processing, video processing, image processing, music play, combinations thereof, and the like, as well as subsystems and/or components. The applications 42 can be stored in the memory 40 and/or in a firmware 52, and can be executed by the processor 36. The firmware 52 can also store code for execution during initialization of the device 10.

A communications component 54 can interface with the processor 36 to facilitate wired/wireless communications with external systems including, for example, cellular networks, VoIP networks, LAN, WAN, MAN, PAN, that can be implemented using Wi-Fi, Wi-Max, combinations and/or improvements thereof, and the like. The communications component 54 can also include a multimode communications subsystem for providing cellular communications via different cellular technologies. For example, a first cellular transceiver 56 can operate in one mode, for example, GSM, and an Nth transceiver 60 can operate in a different mode, for example UMTS. While only two transceivers 56, 60 are illustrated, it should be appreciated that a plurality of transceivers can be included. The communications component 54 can also include a transceiver 62 for unlicensed communications using technology such as, for example, WI-FI, WI-MAX, BLUETOOTH, infrared, IRDA, NFC, RE, and the like. Additionally, a broadcast streaming data receiver (BSDR) 63 can be included. A BSDR 63 can receive broadcast streaming data signals from a specialized streaming data transmitter. The streaming data transmitter can be located on a cell tower with other transmitters and receivers. The communications component 54 can therefore also facilitate communications reception from terrestrial radio networks, digital satellite radio networks, Internet television signals, broadcast television signals, Internet-based radio services networks, combinations thereof, and the like. The communications component 54 can process data from a network such as, for example, the Internet, a corporate intranet, a home broadband network, and the like, via an ISP, DSL provider, or broadband provider.

The device 10 includes a display 20 for displaying multimedia such as, for example, text, images, video, telephony functions such as Caller ID data, setup functions, menus, music metadata, messages, wallpaper, graphics, and the like.

An input/output (I/O) interface 64 can be provided for input/output of data and/or signals. The I/O interface 64 can be a hardwire connection, such as, for example, a USB, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, monitor, display, LCD, combinations thereof, and the like.

Audio capabilities can be provided by an audio I/O component 66 that can include a speaker 14 for the output of audio signals and a microphone 16 to collect audio signals.

The device 10 can include a slot interface 70 for accommodating a subscriber identity system 72 such as, for example, a SIM or universal SIM (USIM). The subscriber identity system 72 instead can be manufactured into the device 10, thereby potentially obviating the need for a slot interface 70.

The device 10 can include an image capture and processing system 74. Photos and/or videos can be obtained via an associated image capture subsystem of the image system 74, for example, a camera. The device 10 can also include a video component 76 for processing, recording, and/or transmitting video content.

A location component 80, can be included to send and/or receive signals such as, for example, GPS data, triangulation data, combinations thereof, and the like. The device 10 can use the received data to identify its location or can transmit data used by other devices to determine the device 10 location.

Figure 3:
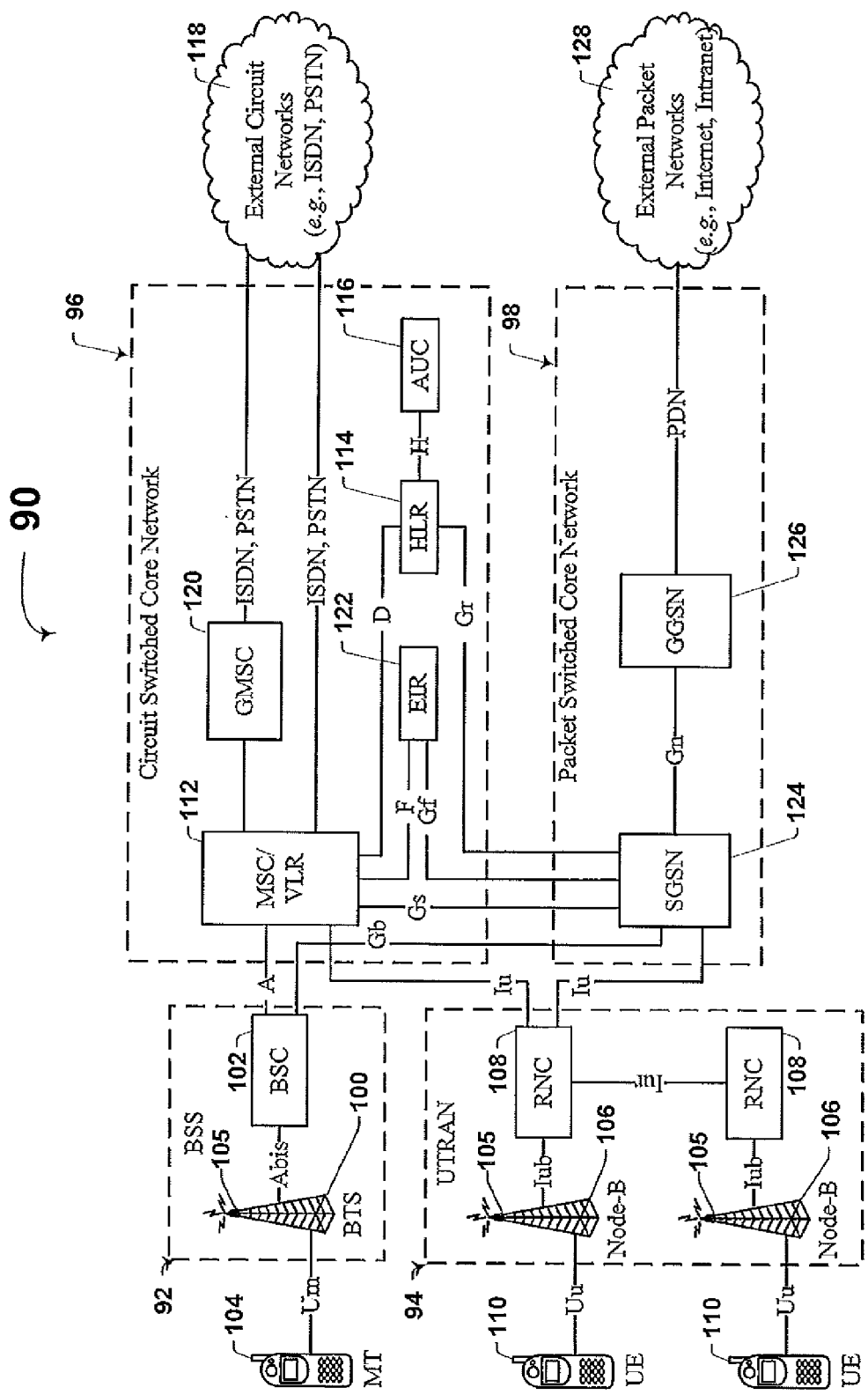
FIG. 3 is a schematic diagram of an exemplary telecommunications network.

The device 10 can include a power source 82 such as batteries and/or other power subsystem (AC or DC). The power source 82 can interface with an external power system or charging equipment via a power I/O component 84.Referring now to FIG. 3, an exemplary telecommunications network 90 in which the present invention can be employed is illustrated. The telecommunications network 90 illustrates elements of both a GSM and UMTS network. As such, radio access networks (RANs) are illustrated as a base station subsystem (BSS) 92 for a GSM network and a UTRAN 94 for a UMTS network. The RANs 92, 94 are in communication with a circuit switched core network 96 and a packet switched core network 98 via respective interfaces A, Gb, and Iu. Basic elements of these networks are described as reference for the reader and to illustrate an exemplary environment in which the present invention may be practiced. It should be understood, however, that the present invention is not limited to a GSM and/or UMTS network and may be alternatively be practiced in other network types, for example, code division multiple access (CDMA), CDM92000, variations thereof, and the like.

The illustrated BSS 92 can include one or more base transceiver stations (BTS) 100 in communication with a base station controller (BSC) 102 via an A-bis interface. Although not illustrated, a packet control unit (PCU) can be implemented within the BSC 102 or in communication with the BSC 102 to facilitate packet-based communication between the BSC 102 and the packet switched core network 98. The BTS 100 and accompanying BTSs (not shown) communicate with a mobile terminal 104 via a Um air interface. The BSS 92 can also include a broadcast streaming data transmitter (BSDT) 105 that can broadcast streaming video signals, audio signals, data, a combination thereof, or the like, for reception by a BSDR 63 of one or more mobile terminals 104.

The illustrated UTRAN 94 can include one or more Node-B elements 106. A node-B is the logical equivalent of a GSM BTS 100 for a UMTS network. Each node-B 106 is in communication with a radio network controller (RNC) 108 via an Iub interface. The RNCs 108 can communicate with one another via an Iur interface. The node-B elements 106 communicate with user equipment (UE) 110 via a Uu air interface. The UTRAN 94 can also include a BSDT 105 that can broadcast streaming video signals, audio signals, data, a combination thereof, or the like, for reception by a BSDR 63 of one or more UE 110.

The illustrated circuit switched core network 96 includes a mobile switching center (MSC) and visited location register (VLR) 112 that is in communication with the BSC 102 and RNC 108 via the A and Iu interfaces, respectively. The MSCNLR 112 routes all incoming and outgoing calls to and from wireline and wireless networks. For example, when a user wants to make an outgoing call, the VLR portion of the MSCNLR 112 determines whether the caller is actually authorized to make the call. In certain instances, such as international dialing, for example, a message barring the user from making the call may be generated by the VLR portion of the MSCNLR 112, and sent to the user's MT 104 or UE 110.

The MSCNLR 112 is in communication with a home location register (HLR) 114 via a D interface. The HLR 114 provides the administrative information required to authenticate, register, and route calls for network subscribers.

The HLR 114 is illustrated as being in communication with an authentication center (AuC) 116 via an H interface. It should be understood, however, that the AuC 116 may be embodied within the HLR 114.

The MSCNLR 112 is also in communication with one or more external circuit networks 118 directly or via a gateway GMSC 120, and an equipment identity register (EIR) 122 via an F interface. The EIR 122 is in communication with the MSCNLR 112 via an F interface and is serving a GPRS support node (SGSN) 124 via a Gf interface. The HLR 114 and MSCNLR 112 are each in communication with the SGSN via respective interfaces Gr and Gs. The SGSN 124 tracks the location of an MT 104 or a UE 110, and performs security functions and access control. The SGSN 124 is in communication with a gateway GPRS support node (GGSN) 126 via a Gn interface. The GGSN 126 supports the edge routing function of the GPRS core network 98 to external packet networks 128 (e.g., Internet, Intranet). The GGSN 126 can include firewall and filtering functionality to protect the integrity of the GPRS core network 98. The GGSN 126 can also be in communication with a billing system (not shown).

The network can also include other elements, such as short message service centers (SSMC), multimedia message service centers (MMSC), signaling networks (e.g., SS7), advanced multimedia networks (e.g., an IP multimedia subsystem), and the like are not illustrated in this figure, but are contemplated and can be included where applicable.

Figure 4:
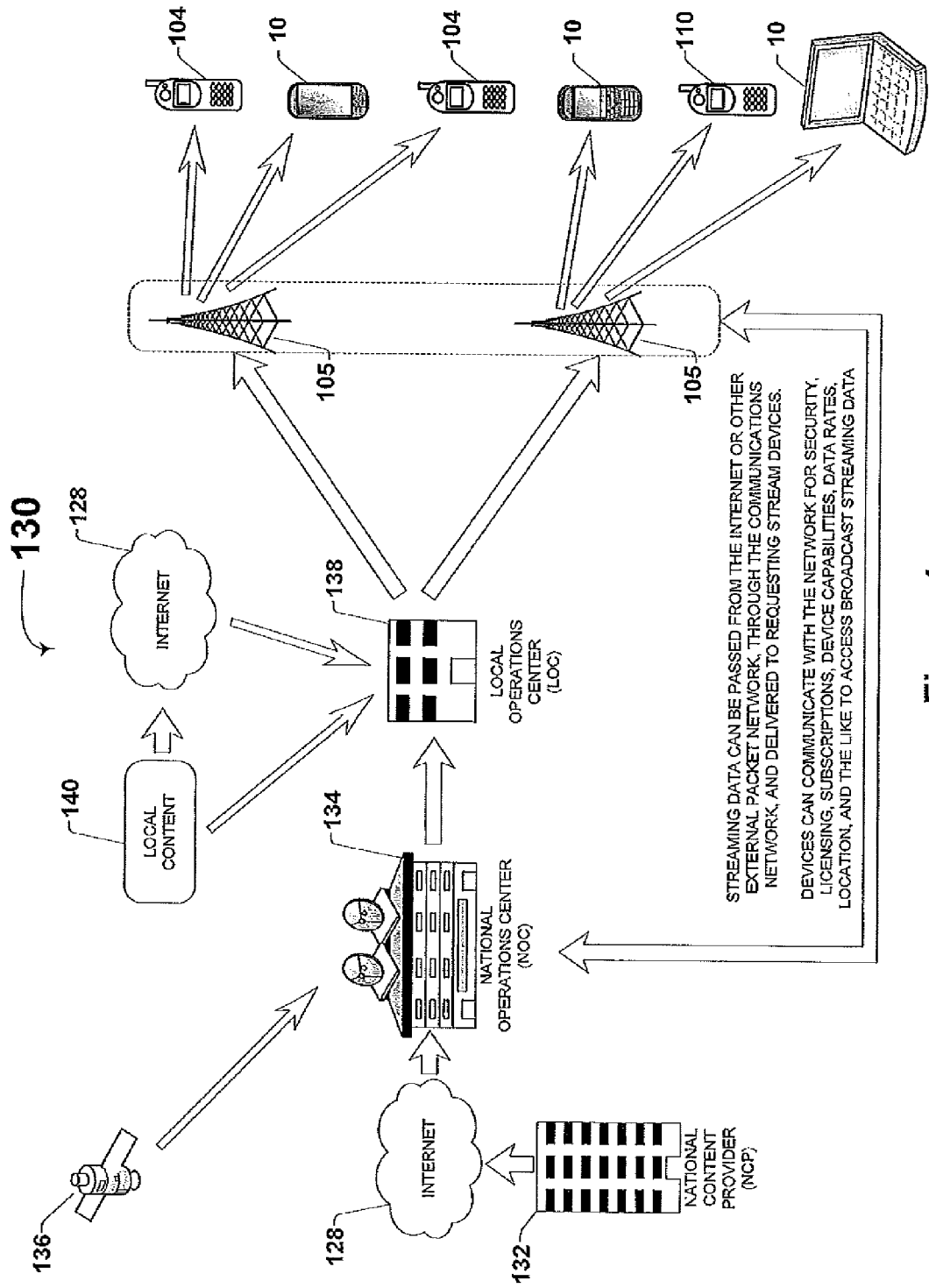
FIG. 4 schematically illustrates an exemplary multimedia subsystem network of an exemplary telecommunications network.

Referring now to FIG. 4, an exemplary advanced multimedia subsystem network (multimedia subsystem) 130 is schematically illustrated. It should be understood that the schematic illustration of FIG. 4 is exemplary only. Furthermore, it must be understood that many components are sometimes grouped together and shown as one component, or omitted entirely. In other words, FIG. 4 is not a complete illustration of a multimedia subsystem 130, but FIG. 4 is adequate to convey the basic setup of a multimedia subsystem 130.

A multimedia subsystem 130 can function as a subsystem of a communications network 90. As illustrated, the multimedia subsystem 130 can include one or more mobile terminals 104, user equipment 110, or other devices 10. Any or all mobile terminals 104, user equipment 110, and/or devices 10 can include a BSDR 63.

A BSDR 63 can enable mobile terminals 104, user equipment 110, and/or devices 10 to receive streaming data that is broadcast by a BSDT 105. However, it should be understood that streaming data can be delivered to mobile terminals 104, user equipment 110, and/or devices 10 using other delivery methods, such as internet protocol (IP), or the like, and that a BSDR 63 is not required to receive data. Instead, the BSDR 63 is designed to receive specialized streamed data signals that are broadcast over designated frequencies and/or channels for devices that are equipped with a BSDR 63.

Various components of the multimedia subsystem 130 can determine what content is streamed over the BSDT 105. It should be understood that the components that can determine what content is streamed over the BSDT 105 can be software, hardware, human operators, combinations thereof, or the like. For ease of illustration and description, however, these components have been representatively illustrated as buildings.

A national content provider 132 can deliver programming via an external packet network 128, e.g., the Internet, to a National Operations Center (NOC) 134. The NOC 134 can also receive programming from a national content delivery platform 136, such as, but not limited to, a satellite, a digital television feed, a cable feed, fiber network lines, telephone data lines, and the like. After the NOC 134 receives the content, the content can be distributed on a wide scale across a network, for example, worldwide, nationally, or the like. There can be a Local Operations Center (LOC) 138 that, similar to the NOC 134, also receives content from various sources, including the NOC 134. In addition to the content distributed by the NOC 134, the LOC 138 can receive content from an external packet network 128, such as, but not limited to, the Internet. The LOC 138 can also receive local programming from a local content provider (LCP) 140, and/or other feeds such as cable, digital television feeds, and the like (not illustrated). The LOC 138 can determine what content will be delivered across the multimedia subsystem 130, and the communications network 90. These determinations can be made in any number of ways, for example, by program ratings, audience demographics, transmitter location, time of day, time of month, time of year, traffic emergencies, combinations thereof, and the like.

The content package can be distributed across a network 90. The content can be fed to at least one BSDT 105, or the content can be fed to multiple BSDTs 105 (as illustrated). Additionally, or in the alternative, the content can be delivered to every BSDT 105 on the network 90. After receiving the relayed content feed, the BSDT 105 can transmit the content in a broadcast format for reception by a BSDR 63 of mobile terminals 104, user equipment 110, and/or devices 10.

For example, the BSDT 105 could transmit the content package as a multicast data stream on a channel that is not typically available for other tasks, such as, a multicast over UHF channel 55.

Decisions relating to programming content are typically made at a remote location, i.e., remote from the BSS 92 and/or the UTRAN 94. Once a content package is determined, package contents are delivered to the BSS 92 and/or the UTRAN 94, and more particularly, to the BSDTs 105 for distribution. Also, it should be understood that at any given time, multiple mobile terminals 104, user equipment 110, and/or devices 10 simultaneously can receive broadcast signals, packets of data, or both.

As illustrated, other components of a network 90 can handle tasks related to broadcast capabilities of a network 90, for example, key distribution, subscription information, location information, device capability information, combinations thereof, or the like. Other components of a network 90 can communicate with a broadcast portion of a network 90 to optimize performance of broadcast tasks. For example, a device 10 can connect through a packet portion of a network 90 to an external packet network 128, e.g., the Internet, to pass subscription information, capability information, or the like relating to the device 10 to an NOC 134. The device 10 can also receive data relating to encoding, or the like, to enable the device 10 to display received broadcast data from an MSDT 105. Furthermore, devices can receive point-to-point streams from the NOC 134 over a network.

Figure 5:
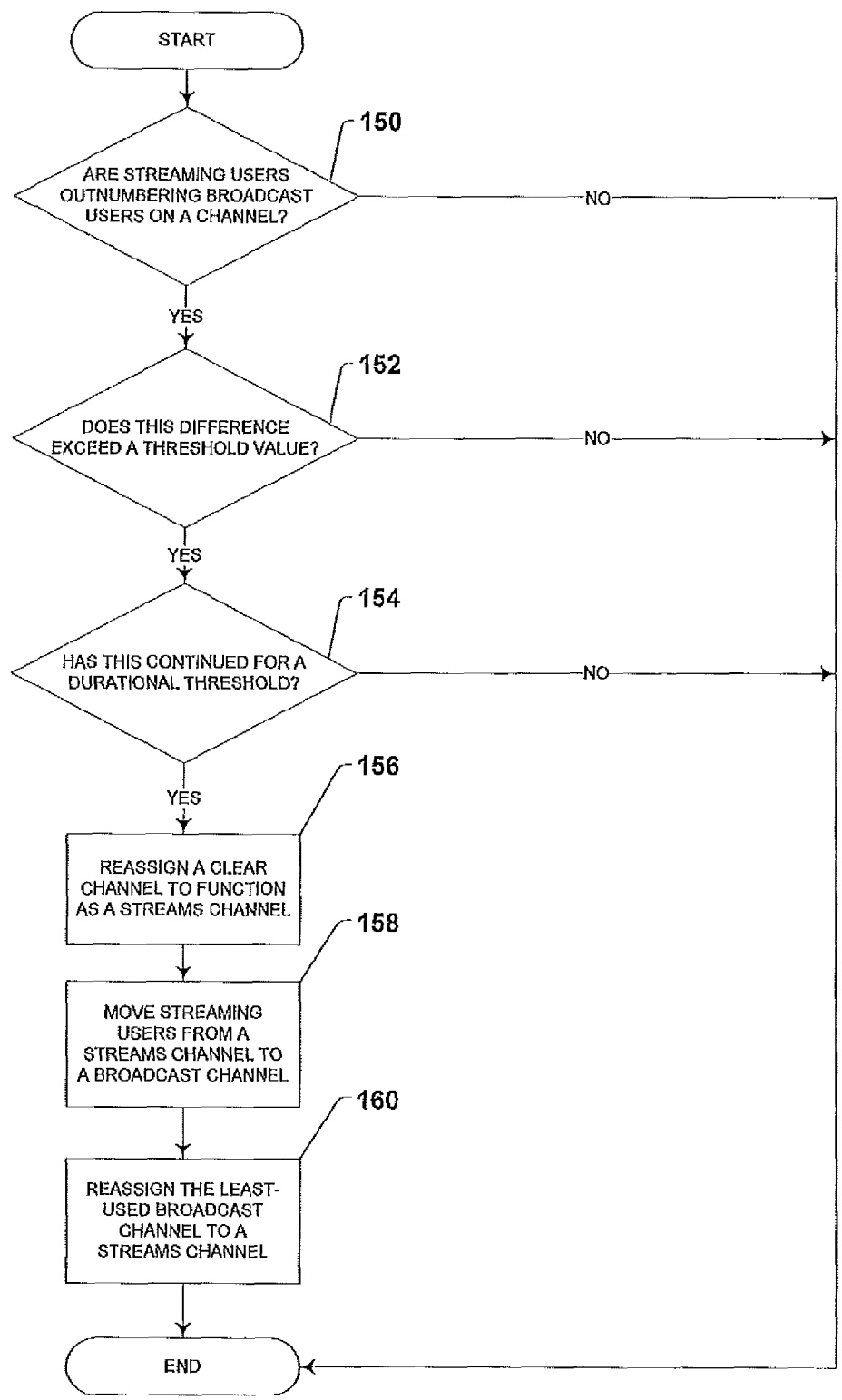
FIG. 5 schematically illustrates an exemplary method of optimizing network delivery of streamed content to an exemplary device.

Turning now to FIG. 5, an exemplary method for dynamically optimizing network delivery of streaming content is schematically represented. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims.

At the beginning of the method schematically illustrated in FIG. 5, a TXRX 62 of at least one device 10, mobile terminal 104, or user equipment 110 is receiving streaming data over a packet portion of the communications network 90. Additionally, a BSDR 63 of at least one device 10, mobile terminal 104, or user equipment 110 is receiving broadcast streaming data over a multimedia subsystem 130 of a communications network 90. For purposes of describing the method illustrated in FIG. 5, the term "controller" will be used.

For purposes of this application and the appended claims, the term "controller" includes a network component that can monitor usage of the broadcast portion of the network 90, and the packet portion of the network 90. This monitoring can be performed substantially continuously or intermittently. The monitoring can also be prompted by certain events, such as a spike in data traffic, a drop in voice traffic, or the like. The controller also can determine what content is fed to the packet portion and/or to the broadcast portion of the network 90. The controller can also determine when switching should occur, e.g., moving a stream data feed from a device to a transmitter and then broadcasting the streaming data stream instead of using point-to-point data streaming. It should be understood that the tasks ascribed to the controller can be performed by software, a human operator, hardware, combinations thereof, or the like, and that the task need not be performed entirely or exclusively by one such component. Examples of network components that can be suitable to perform some or all of the tasks of the controller include, but are not limited to, a BSC 102, an MSC 112, a SGSN 124, or a GGSN 126, or the like.

Additionally, or in the alternative, an electronic component on an external packet network 128, a human network operator, or the like, can function as a controller.

At block 150, a controller can analyze usage of a network 90 to determine the number of clients, i.e., devices 10, mobile terminals 104, user equipment 110, or the like, using point-to-point IP protocol to receive streaming content ("streaming users"). The controller also can analyze usage of a network 90 to determine the number of devices receiving broadcast streaming content of a particular program ("broadcast users"). The controller can determine if the number of streaming users outnumbers the number of broadcast users. Since the broadcast channel can multicast any number of programs at any given time, it should be noted that this query can consider the total number of broadcast users, or the number of broadcast users viewing a particular program included in a content package. Additionally, or in the alternative, the controller can consider the number of broadcast users accessing each program included in a content package. For purposes of this description, the latter approach will be assumed, i.e., the controller considers each program included in the content package and determines how many broadcast users are watching each program at any given time. After these numbers are obtained, the controller can compare the number of streaming users to the number of broadcast users watching each program. If the number of broadcast users viewing each program outnumbers the number of streaming users viewing each program, then the controller can stop and the process can end. If the number of streaming users viewing any program outnumbers the number of broadcast users viewing any program, then the process can proceed to block 152.

At block 152, a controller can determine whether the difference determined in block 150 exceeds a threshold value. The threshold value can be a percentage, e.g., 5%, 10%, 25%, or the like. For example, if there are 100 streaming users and the threshold is set at 25%, then a controller can abort the process if there are less than 125 broadcast users watching a broadcast program. The threshold value can also be a number, e.g., 5, 10, 25, or the like. For example, if the number is set at 25, then until there are 25 more broadcast users than streaming users, the controller can abort the process. It should be understood that the threshold value need not be the same for each BSDT 105/BTS 106, and that the threshold can change according to many factors, including, but not limited to, the time of day, the day of the week, network traffic, the number of devices connected to the network, combinations thereof, or the like. Furthermore, it should be understood that the controller can determine which devices to include in all of these calculations based upon any criteria, including, but not limited to, device memory, device processor speed, device compatibility with the BSDT 105, combinations thereof, or the like. If the difference determined in block 150 does not exceed the threshold value, then the process can end. If the difference determined in block 150 exceeds the threshold value, then the process can continue at block 152.

At block 154, a controller can determine whether the difference determined in block 150, and established as exceeding the required threshold in 152, exceeds a durational threshold. A durational threshold can be, but is not necessarily, used to ensure that temporary spikes in demand do not, in and of themselves, prompt activity on the part of a controller. A durational threshold can be any period of time, for example, 500 milliseconds, 1 second, 2 seconds, 5 seconds, ten seconds, 1 minute, 1 hour, or the like. As with the threshold value applied in block 152, the durational threshold can also fluctuate according to various factors, including, but not limited to, the time of day, the location of the transmitter, the equipment connected to the transmitter, combinations thereof, or the like. If a durational threshold has not been satisfied, then the process can end. If a durational threshold has been satisfied, then the process can continue with block 156.

At block 156, the controller can reassign a clear channel at a BSS 92 or a RNC 108 to function as a streams channel. Once the clear channel is reassigned to function as a streams channel, the streams channel can accept broadcast users of a low-demand broadcast channel, and a data stream corresponding to the low-demand broadcast channel program, as will be explained below. Once the new streams channel is ready, the process can proceed at block 158.

At block 158, the high-demand program that is currently being streamed to a number of devices can be moved to the broadcast channel that was cleared of users and content in block 156. This step can be completed in a number of ways. As was explained above, the content package that is sent to the BSDTs 105 for broadcast is generally assembled at an LOC 138, Therefore, there are several ways to move a program from a point-to-point stream to a broadcast stream. For example, the controller can direct the LOC 138 to substitute a broadcast program, typically the program that currently has the lowest demand and that is included in the package, with a program that is currently being streamed to numerous streaming users. Alternatively, if there are open broadcast channels at the BSDT 105, then a data stream can be opened by the BSDT 105, the data stream can be encoded and broadcast over the previously empty broadcast channel. In other words, the substitution of the streams channel for the broadcast channel can, occur at the BSDT 105, or elsewhere, for example, a BSS 92, a RNC 108, a BSC 102, an SGSN 124, a GGSN 126, the LOC 138, or elsewhere.

Additionally, as shown in block 160, a controller also can move a low-demand broadcast program from the BSDT 105 to a streams channel to free up a broadcast channel for a future move, Multiple low-demand programs can be moved if desired, to free up multiple broadcast channels for future moves. As explained above, this step can be performed at the BSDT 105, the LOC 138, or elsewhere. After, before, or while the move is occurring, devices 10, mobile terminals 104, or user equipment 110 watching that broadcast program can be instructed to move off of the broadcast channel, to a streams channel, and to open a data session to continue receiving the program as a point-to-point data stream. The process can now end.

It should be understood that the entire method illustrated in FIG. 5 can be iterated at any desired interval or upon occurrence of any trigger event, For example, the method illustrated in FIG. 5 can be performed if there are any spikes in data traffic. A "spike in data traffic" can be defined by the network operators. For example, if there is a 1%, 10%, 100%, 1000%, or the like increase or more in data traffic, the method of FIG. 5 can be performed to optimize network performance. The number could also be a straight number of users, for example, 5, 10, 25, 100, 1000, or the like. Alternatively, the method can be iterated according to a set schedule, for example, every 1 second, 2 seconds, 5 seconds, 10 seconds, 30 seconds, 1 minute, 1 hour, or the like. The times and percentages noted here are exemplary only. An increase that defines a "spike in data traffic" can include any percentage or number of users, and the percentage or number can change, as explained above with respect to block 152. Furthermore, any time can be selected. A network operator can determine when and how often to iterate this method according to any factors.

It should also be understood that the method illustrated in FIG. 5 also can be used to move broadcast channel users to streams channels. Additionally, certain limitations can be put in place at certain times of day, at certain locations, with certain devices, or the like, to limit the effects of this method and/or to limit when iterations of the method will occur. For example, while a percentage of only 10% may be required to move stream users to a broadcast channel, a 25% change in broadcast users may be required before the method will be used to move a broadcast program back to a streams channel. In other words, the requirements for executing the method can be dynamic, and can be based upon any factors as determined by the network components, and or network operators. Furthermore, there may be motivations such as power loads, processor requirements, or the like, that limit the willingness of the network (as defined by the network operators) to iterate the method illustrated in FIG. 5.

Figure 6:
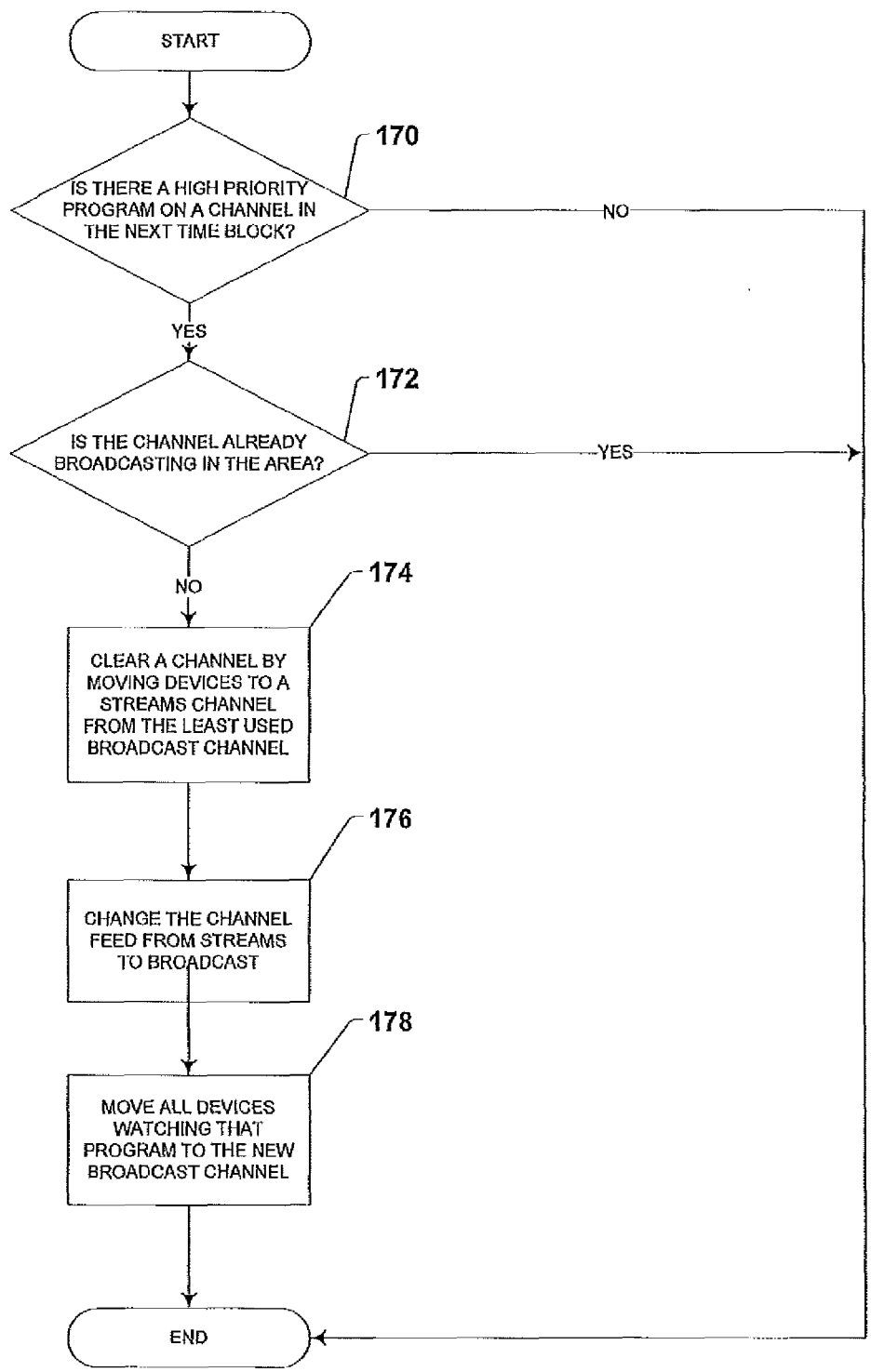
FIG. 6 schematically illustrates an alternative exemplary method of optimizing network delivery of streamed content to an exemplary device.

Referring now to FIG. 6, an exemplary method of optimizing network delivery of streaming content is schematically represented. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the methods illustrated in FIGS. 5 and 6 can be used in conjunction with one another to optimize network delivery of streaming content. It should also be understood that a computer-readable medium can include computer-executable instructions corresponding to the method illustrated and described in FIG. 5, FIG. 6, or both. These computer-executable instructions can be executed by an appropriate device that will thereby perform the steps of the methods illustrated in FIG. 5, FIG. 6, or both in combination.

In block 170, a controller can evaluate the content package for an area to determine if a high priority program is scheduled in the next time block. It should be understood that "time block" can include any span of time. For example, since scheduled video program content frequently changes at either half-hour or one-hour increments, "time block" can refer to half-hour increments. However, other time blocks are possible and are contemplated. For example, "time block" can refer to two-hour or three-hour increments, for example. In the case of half-hour increments, the controller can evaluate the scheduled programming shortly before the next half-hour increment of programming begins to determine if there are any high-priority programs scheduled for the next time bock. If no high-priority programs are recognized, then the process can end. If one or more high-priority programs is found, then the process can continue to block 172.

At block 172, a controller can evaluate the current broadcast content package to determine whether a channel that will carry a high-priority program is already broadcasting in the area. If a broadcast channel that will carry a high-priority program is already broadcasting in the area, then the process can end. If a channel that will carry a high-priority program is not already broadcasting in the area, then the process can continue with block 174.

At block 174, the broadcast channel with the fewest number of users can be identified. If the broadcast channel with the fewest number of users is scheduled to carry a high-priority program in the next time block, then the broadcast channel with the next fewest number of users can be identified. Once a broadcast channel with few users and no high-priority programs in the next time block is identified, the users of that broadcast channel can be directed to move over to a streams channel to view the program that was, until this point, broadcasting on a broadcast channel. At the same time, a point-to-point IP stream session can be opened for each user. Each user can be moved from the broadcast channel to a streams channel and can receive a point-to-point data stream. After all of the users are moved to a streams channel, the process can continue with block 176.

At block 176, a channel with a high priority program can be changed from a streams channel to a broadcast channel. Since a channel that was broadcasting a low priority show, as determined in block 174, has been changed to a streams channel, there is a free broadcast channel available to broadcast the previously streamed channel. After the streaming data channel is changed to a broadcast channel, the process can continue with block 178.

At block 178, all of the devices that can receive broadcast streaming data can be moved to the new broadcast channel. Devices that cannot receive broadcast streaming data, i.e., devices that do not have a BCDR 63, or an equivalent, can continue viewing the program as streamed data. Once the devices that can receive broadcast streamed data are connected, the process can end.

Although not illustrated, it should be noted that the controller can optionally evaluate each new data stream that is requested. If a device that is capable of receiving broadcast data initiates a point-to-point data stream, then the requested data can be analyzed. If the requested data is currently included in a broadcast content package, then the controller can instruct the device to move to the appropriate broadcast channel to continue receiving the desired program as broadcast data. This is another method for dynamically optimizing network resources. This method can be implemented alone, or in combination with the methods illustrated and described in FIG. 5, FIG. 6, or both in combination.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system, comprising;
   a processor; and
   a memory storing computer readable instructions which, when executed by the processor cause the processor to:
   determine a number of mobile streaming devices, wherein a mobile streaming device is an electronic device receiving first data through a point-to-point streaming data session and is capable of receiving data transmitted by a broadcast transmitter;
   determine a number of mobile broadcast devices, wherein a mobile broadcast device is an electronic device receiving second data transmitted by the broadcast transmitter and is capable of receiving data transmitted through a point-to-point streamlining data session;
   calculate a difference between the number of mobile streaming devices and the number of mobile broadcast devices to form a calculated difference; and
   determine whether the calculated difference exceeds a predetermined threshold value.

2. The system of claim 1, wherein if the calculated difference exceeds the predetermined threshold value, the processor causes the first data to be routed for transmission by the broadcast transmitter.

3. The system of claim 1, wherein if the calculated difference exceeds the predetermined threshold value, then the processor further:
  calculates a duration for which the calculated difference has exceeded the predetermined threshold value; and
  determines, based on the calculated threshold, if the calculated difference has exceeded the predetermined threshold value for a durational threshold.

4. The system of claim 3, wherein if the calculated difference has exceeded the threshold value for the durational threshold, the processor instructs the mobile streaming devices to initiate reception of the first data from the broadcast transmitter on a broadcast channel.

5. The system of claim 3, wherein if the calculated difference has exceeded the threshold value for the durational threshold, the processor causes ceasing of broadcasting of the second data.

6. The system of claim 3, wherein if the calculated difference has exceeded the threshold value for the durational threshold, the processor instructs the mobile broadcast devices to initiate a point-to-point data session for delivery of the second data.

7. The system of claim 1, wherein the first data is streaming video content.

8. The system of claim 1, wherein the second data is streaming video content.

9. A system comprising:
  a processor;
  a memory storing computer readable instructions which, when executed by the processor, cause the processor to:
    determine a number of mobile streaming devices, wherein a mobile streaming device is an electronic device receiving first data through a point-to-point streaming data session and is capable of receiving data transmitted by a broadcast transmitter;
    determine a number of mobile broadcast devices, wherein a mobile broadcast device is an electronic device receiving second data transmitted by a broadcast transmitter and is capable of receiving data transmitted through a point-to-point streaming data session;
    calculate a difference between the number of mobile streaming devices and the number of mobile broadcast devices to form a calculated difference;
    determine if the calculated difference exceeds a predetermined threshold value; and
    if the calculated difference exceeds the predetermined threshold value, perform a set of actions selected from a group of action sets consisting of:
      (A) calculating a duration for which the calculated difference has exceeded the predetermined threshold value, determining, based on the calculated duration, if the calculated difference has exceeded the predetermined threshold value for a durational threshold, and if the calculated difference has not exceeded the predetermined threshold value for the durational threshold, not causing the first data to be routed for transmission by a broadcast transmitter; and
      (B) ceasing broadcasting of the second data and instructing the broadcast devices to initiate a point-to-point data session for delivery of the second data.

10. The system of claim 9, wherein the first data is streaming video content.

11. The system of claim 9, wherein the second data is streaming video content.

12. A system, comprising:
  a processor; and
  a memory storing computer-readable instructions which, when executed by the processor, cause the processor to:
    determine if a high-priority video stream is scheduled to be broadcast at a designated time;
    if the high-priority video stream is scheduled to be broadcast at the designated time, determine if the high-priority video stream is scheduled for transmission on a channel that is configured for broadcast at the designated time; and
    if the high-priority video stream is not scheduled for transmission on a channel that is configured for broadcast at the designated time, identifying a channel with a fewest number of users that is configured for broadcast at the designated time.

13. The system of claim 12, wherein if the high-priority video stream is not scheduled for transmission on a channel that is configured for broadcast at the designated time, the processor determines if the channel with the fewest number of users is configured for broadcasting a low-priority data stream at the designated time.

14. The system of claim 13, wherein if the channel with the fewest number of user is configured for broadcasting a low-priority data stream at the designated time, the processor causes the low-priority data stream to be routed as point-to-point streaming data session.

15. The system of claim 13, wherein if the channel with the fewest number of user is configured for broadcasting a low-priority data stream at the designated time, the processor causes the high-priority data stream to be transmitted on the channel with the fewest number of users at the designated time.

16. The system of claim 12, wherein if the high priority video stream is not scheduled for transmission on a channel that is configured for broadcast at the designated time, the processor further determines whether the channel with the fewest number of users is scheduled to broadcast another high-priority video stream at the designated time.

17. The system of claim 16, wherein if the channel with the fewest number of users is scheduled to broadcast another high-priority video stream at the designated time, the processor identifies another channel with a next fewest number of users and determines whether the other channel is scheduled to broadcast another high-priority video stream at the designated time.

18. The system of claim 17, wherein if the processor determines that the other channel with the next fewest number of users is scheduled to broadcast another high-priority video stream at the designated time, the processor continues to identify channels with the next fewest number of users until the processor identifies a channel with the next fewest number of users that is not scheduled to broadcast another high-priority video stream at the designated time.

19. The system of claim 16, wherein the processor causes the high-priority video stream to be broadcast on the identified channel with the fewest number of users that is not configured to broadcast another high-priority video stream at the designated time.

20. The system of claim 16, wherein the processor further causes a video stream that is not a high-priority video stream that is scheduled for transmission on the identified channel with the fewest number of users to be routed as a point-to-point data session.

* * * * *